United States Patent [19]
Dodt et al.

[11] Patent Number: 5,369,532
[45] Date of Patent: Nov. 29, 1994

[54] METHOD AND APPARATUS FOR MANAGING DATA ON REWRITABLE MEDIA TO DEFINE READ/WRITE OPERATIONAL STATUS

[75] Inventors: William C. Dodt, Broomfield; Jerry L. Donze, Arvada; Terry R. Gottehrer, Louisville; Ronald W. Korngiebel, Broomfield; Donald F. McCarthy, Westminster, all of Colo.

[73] Assignee: Storage Technology Corporation, Louisville, Colo.

[21] Appl. No.: 896,106

[22] Filed: Jun. 9, 1992

Related U.S. Application Data

[63] Continuation-in-part of Ser. No. 791,489, Nov. 12, 1991, abandoned.

[51] Int. Cl.$^5$ .................. G11B 5/09; G11B 15/04; G11B 19/04
[52] U.S. Cl. ........................ 360/48; 360/53; 360/60
[58] Field of Search ............. 360/32, 48, 46, 60, 360/72.1, 72.2, 53

[56] References Cited
U.S. PATENT DOCUMENTS

| | | | |
|---|---|---|---|
| 4,849,878 | 7/1989 | Roy | 364/200 |
| 5,016,121 | 5/1991 | Peddle et al. | 360/39 |
| 5,029,022 | 7/1991 | Odaka et al. | 360/48 |
| 5,081,548 | 1/1992 | Inazawa et al. | 360/72.2 |
| 5,091,805 | 2/1992 | Odaka et al. | 360/48 |
| 5,119,291 | 6/1992 | Flannagan et al. | 395/275 |
| 5,218,696 | 6/1992 | Baird et al. | 395/600 |

FOREIGN PATENT DOCUMENTS 459041  5/1990  European Pat. Off. .

Primary Examiner—Donald Hajec
Assistant Examiner—T. N. Forbus, Jr.
Attorney, Agent, or Firm—Duft, Graziano & Forest

[57] ABSTRACT

Control software and hardware in the tape drive control unit creates and manages a header segment at the beginning of the magnetic tape. This header segment includes an administrative information section that contains data relating to the magnetic tape itself. The administrative information includes read/write status information such as the write protect status of the magnetic tape that enables the tape drive control unit to manage the data records written onto the magnetic tape without reference to any other source of administrative data. In addition, each data record written on the magnetic tape includes a header which denotes the read/write status of the data record.

34 Claims, 8 Drawing Sheets

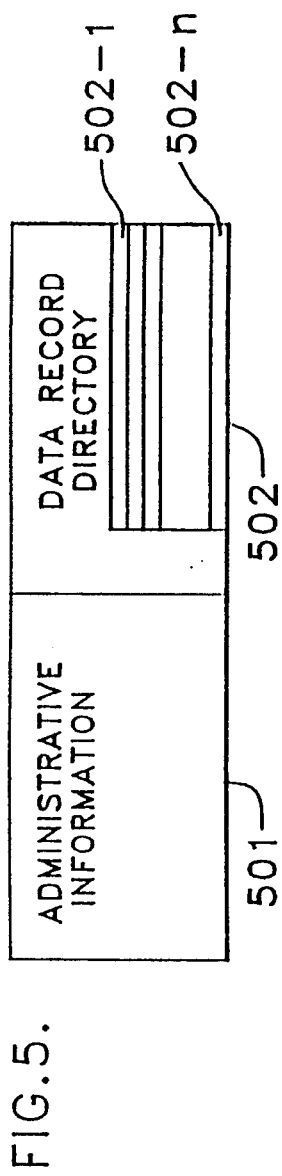

METHOD AND APPARATUS FOR MANAGING DATA ON REWRITABLE MEDIA TO DEFINE READ/WRITE OPERATIONAL STATUS

CROSS REFERENCE TO RELATED APPLICATIONS

This application is a continuation-in-part of U.S. patent application Ser. No. 07/791,489 titled "Method and Apparatus for Administering Data on Magnetic Tape Media" filed Nov. 12, 1991, now abandoned.

FIELD OF THE INVENTION

This invention relates to magnetic data recording and, in particular, to a method and apparatus for defining the operational mode required for a drive element to read/write data on a rewritable media.

PROBLEM

It is a problem in the field of data storage systems to maximize the data storage capacity of the data storage media while minimizing both the cost of the media and the data retrieval time. Magnetic tape has become the industry standard data storage media for the storage and retrieval of large amounts of data, where the media cost must be kept to a minimum and the data retrieval time is not a critical factor. The data storage capacity and media cost of magnetic tape have been reduced by the use of helical scan data recording techniques on magnetic tape media.

A problem with all magnetic tape media is that a significant segment of the data retrieval time represents the mechanical positioning of the magnetic tape on the associated tape drive to locate a specific data record or end of the last written data record on the magnetic tape to enable the associated host computer to begin reading a data record or writing new data records on the magnetic tape. Furthermore, these tape drive systems rely on the host computer to administer the data that is stored on the magnetic tape. The administration includes retaining error logs, user related data, identification of the write protect status of the data, mode of data recording, physical location of the data on the magnetic tape, etc.

It is difficult to ensure that a magnetic tape is properly identified by the host computer to enable the tape drive to be set in the correct mode to read/write data on the magnetic tape. The mode can be a definition of the data format used on the magnetic tape and/or the data integrity mode wherein the magnetic tape is write protected and the data records contained thereon safeguarded. Some magnetic tape cartridges contain user setable write protect features but these are susceptible to error due to the user failing to properly set the feature or the write protect feature inadvertently being reset to the wrong state. Manually operable write protect features are also costly due to the need for time consuming user intervention to activate or deactivate the write protect feature. Similarly, reliance on the host computer to properly identify the write protect status of the magnetic tape cartridge fails to adequately protect the data if the magnetic tape cartridge is loaded on another host computer that is unaware of the write protect status of this data. Therefore, there presently does not exist any reliable and inexpensive method to protect data on magnetic tape media from inadvertently being overwritten.

SOLUTION

The above described problems are solved and a technical advance achieved in the field by the method and apparatus of the present invention for managing data on a rewritable media in a manner to make the rewritable media self-defining. This is accomplished by the use of control software and hardware in a tape drive control unit that creates and manages a header segment written at the beginning of selected magnetic tapes loaded therein. This header segment is interposed between a leader portion of the magnetic tape on the magnetic tape cartridge and the remainder of the magnetic tape contained therein. This header segment contains two sections, a first of which is a data record directory that is used by the tape drive control unit to denote the location of each data record written on the magnetic tape as well as administrative information associated with the data record. The second section of the header segment is an administrative information section that contains data relating to the magnetic tape itself. The administrative information includes the identification of the host computer, the tape drive, file safe (write protect) status of the magnetic tape, identification of the media, error record log and other information that enables the user, the host computer and the tape drive control unit to manage the data records written on the magnetic tape without reference to any other source of administrative data. In addition, the header segment itself can be self protected by computing an error correction code across the data contained within the header segment to enable the control unit to identify whether the header integrity has been compromised.

In operation, whenever the magnetic tape cartridge is mounted on a tape drive and the magnetic tape threaded through the tape threading path onto the tape drive takeup reel, the tape drive control unit accesses the header segment of the magnetic tape to read the administrative data written thereon. If the host computer has requested a read data record operation, the host computer supplied identity of the requested data record is used to scan the data record directory section of the header segment to locate the directory entry relating to the requested data record. Once this directory entry for the requested data record has been located, the control unit retrieves the information contained within this directory entry indicative of the physical position of the requested data record on the magnetic tape. This physical positioning information is then used by the tape drive to quickly and precisely position the beginning of this data record under the read/write heads of the tape drive. The use of this positioning information reduces the tape positioning time, thereby improving the data retrieval time of the tape drive system. This same positioning information is available to locate the end of the last data record written on the magnetic tape to enable the tape drive to write the next successive data record at the physical end of the last previously written data record.

The second section of the header segment includes administrative information including the file safe (write protect) status of the magnetic tape. The tape drive operates independent of the host computer to ensure that the data records stored on this magnetic tape are not inadvertently overwritten by the host computer if this magnetic tape is designated as a file safe tape. This is accomplished by reading the administrative data to determine the file safe status of the magnetic tape. As a further level of security, each data record scan group that is written on to this rewritable media includes a header prepended thereto that includes file safe status bit to indicate whether this specific data record is write protected.

The tape drive, once it writes data records in scan group form onto the magnetic tape, also populates the header segment with data record position information to map between the data record identification and its specific location on the magnetic tape. Therefore, when the host computer attempts to write additional data on this magnetic tape, the tape drive can determine the physical location of the last written data record on the magnetic tape. If the header segment indicates that the magnetic tape is a file safe tape, the tape drive is disabled from writing in the area presently occupied by previously written data records. A new data record can be written on the unused portion of the magnetic tape immediately past the end of the last written data record. Therefore, using the administrative data that indicates the position of the last written data record, the tape drive can position the beginning of the unused portion of the magnetic tape under the read/write heads, juxtaposed to the end of the last previously written data record, to begin writing the newly received data record. The tape drive sets the flag bits in the scan group header for this newly received data record to indicate that this data record is also write protected. This arrangement allows the tape drive itself to manage the file safe write protect status of the magnetic tape and place data indicative of the write protect status of each scan group as well as the entire magnetic tape on the magnetic tape itself to ensure that the write protect information is physically co-located with the data that is to be protected.

Additional read/write modes can be similarly defined using the administrative data and the header of the scan groups. These modes can include retry status and ECC scan groups. Retry status indicates whether scan groups containing detected errors are rewritten further down the length of the tape error free or whether the data records are written in a stream on the magnetic tape as received. The ECC scan groups are optional scan groups inserted into the stream of received data records to perform additional error detection and correction on the recorded data.

BRIEF DESCRIPTION OF THE DRAWING

FIG. 5 illustrates the elements contained in the header segment of the magnetic tape;

FIG. 6 illustrates the elements contained in the directory section of the header segment of the magnetic tape;

FIG. 10 illustrates the elements contained in the administrative section of the header segment of the magnetic tape.

DETAILED DESCRIPTION

The method and apparatus for managing data on rewritable media are used to define the read/write operational status required for a drive element to read/write data on a rewritable media by making the media self-defining. The preferred embodiment disclosed herein is a tape drive that reads/writes data records in helical scan format on a magnetic tape that is housed in a single reel magnetic tape cartridge. This magnetic tape cartridge can be mounted on tape drives connected to different host computers and therefore host computer management of the file safe status and data format of the magnetic tape is not effective. The phrase "file safe" is used herein to identify media that contains data that must not be modified. Additional data can be written to file safe media in locations thereon that do not presently contain data.

Tape Drive System Architecture

Figure 3:
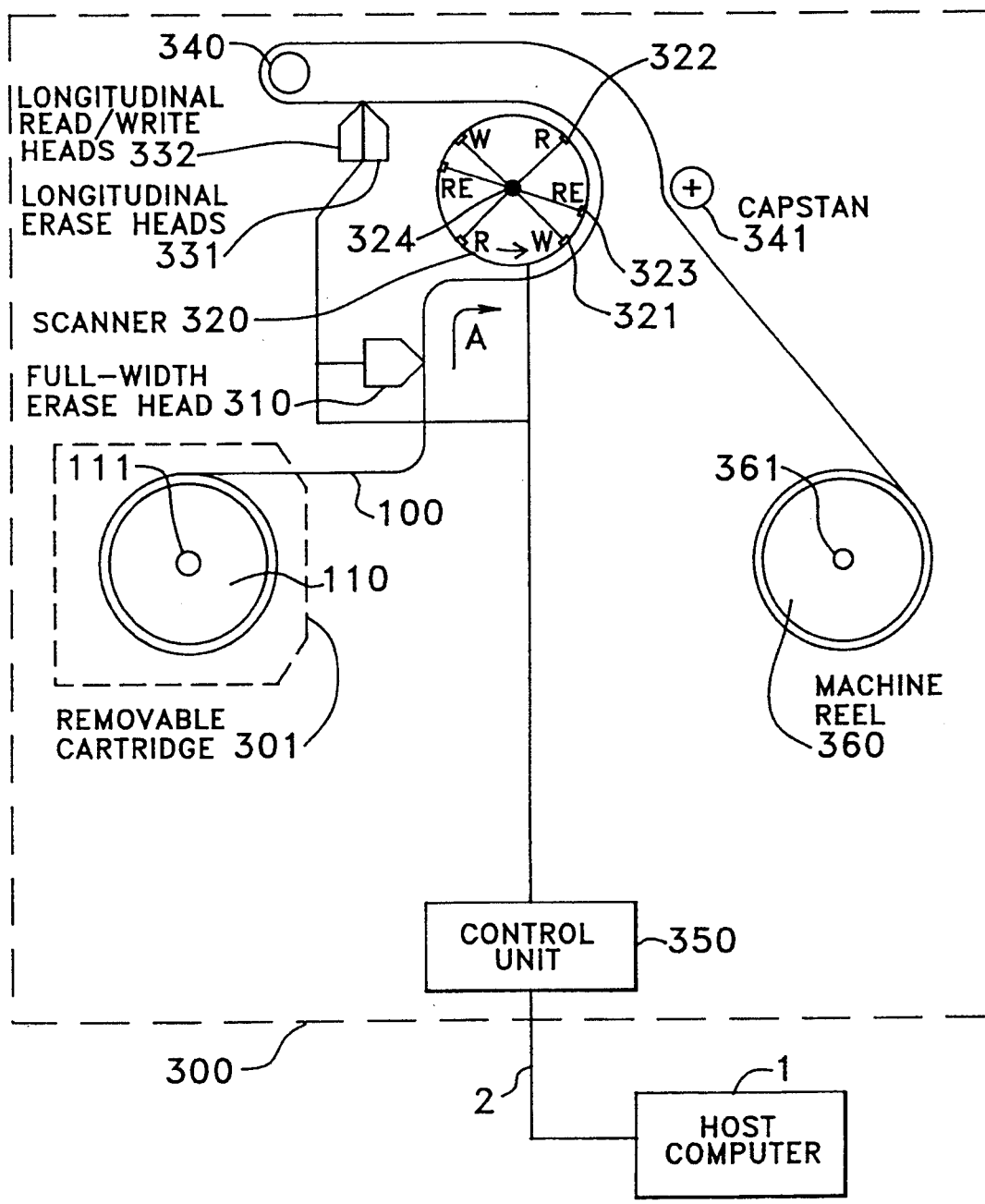
FIG. 3 illustrates in block diagram form the overall architecture of the tape drive.

The apparatus illustrated in FIG. 3 represents the tape transport elements found in a helical scan tape drive 300 that are used to read and write data on magnetic tape 100. The magnetic tape 100 is wound on a single reel 110 which rotates around spindle 111 within magnetic tape cartridge 301. In helical scan tape drive 300, magnetic tape 100 from magnetic tape cartridge 301 is threaded in direction A past a fixed full width erase head 310, scanner 320 (which contains two pairs of helical read heads 322 and two pairs of helical write heads 321 and one pair of erase heads 323), a fixed longitudinal erase head 331 and a fixed longitudinal read/write head 332. The magnetic tape 100 then passes around guide 340, over capstan 341 to be wound on machine reel 360 (takeup reel), which rotates around spindle 361. The full width erase head 310 erases the entire width of magnetic tape 100 and is used when data is recorded on virgin tape. It is also used when data is recorded on a previously used magnetic tape, if none of the data previously recorded on magnetic tape 100 is to be preserved and the entire magnetic tape 100 is overwritten with new data.

Host computer 1 transmits a stream of data records to control unit 350 in tape drive 300, where the data records are formatted for writing in helical scan form on magnetic tape 100 via scanner 320. The tape wrap angle around scanner 320 is slightly greater than 180° so that a pair of read heads 322, a pair of write heads 321 and one erase head 323 are constantly in contact with magnetic tape 100 in order to continuously read and write data thereon. The helical write head pairs 321 simultaneously record two tracks of data at a time on magnetic tape 100 with an azimuth angle between adjacent tracks being plus and minus 20°. Similarly, helical read head pairs 322 simultaneously play back two tracks of data at a time from magnetic tape 100. There are also three fixed longitudinal erase 331 and read/write heads 332 to read and write data on the corresponding three longitudinal tracks contained on magnetic tape 100: control, time code and one to be determined. These three longitudinal read/write heads 332 can be used individually or in any combination when writing new data or reading pre-recorded data.

Physical Format of Helical Scan Magnetic Tape

Figure 1:
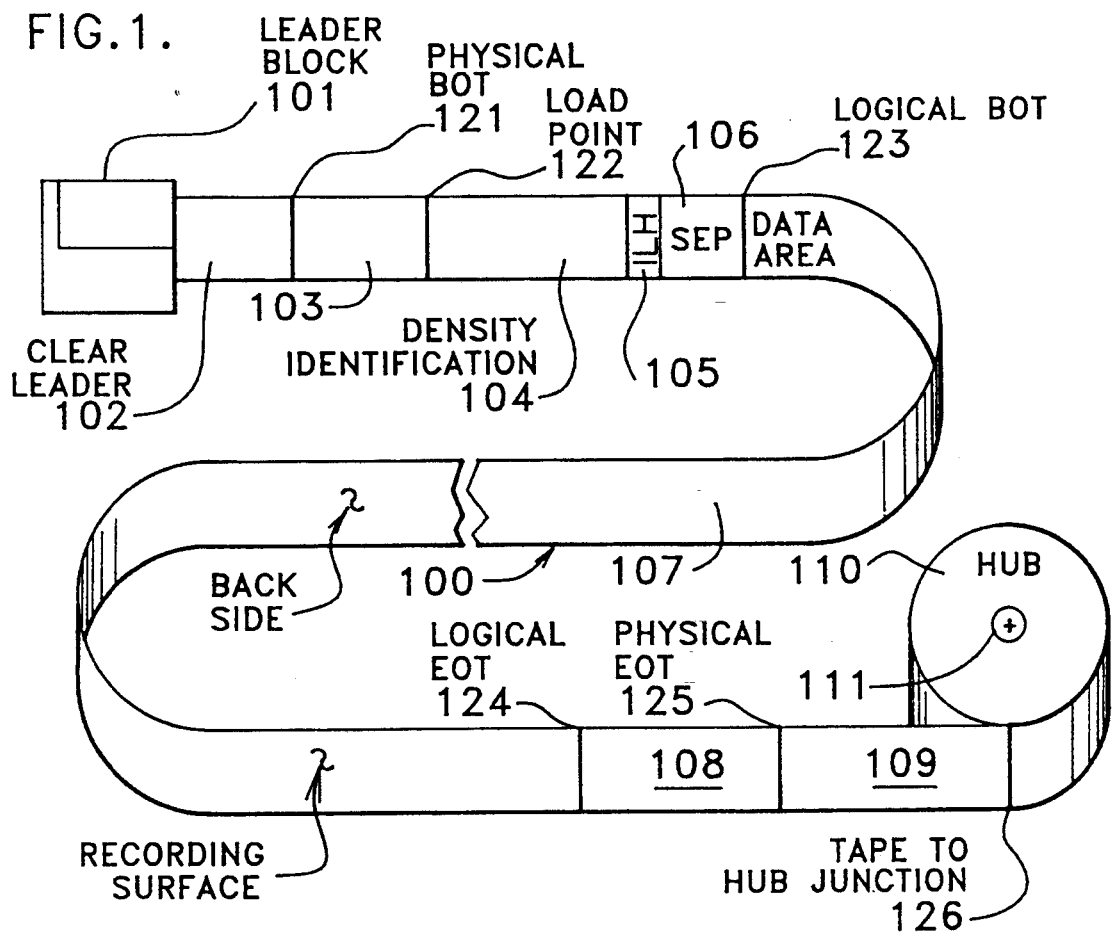
FIG. 1 illustrates the physical format of the magnetic tape.

FIG. 1 illustrates the physical format of the helical scan magnetic tape 100, including the header segment 105 thereof. The magnetic tape 100 includes a leader block 101 that is attached at one end thereto and a single reel 110 around which magnetic tape 100 is wound into cartridge 301. A length of clear leader 102 is optionally interposed between the physical beginning (BOT) 121 of magnetic tape 100 and leader block 101 in order to protect magnetic tape 100 when it is wound in magnetic tape cartridge 301 around reel 110. A length 103 (typically 3 m) of magnetic tape 100 exists between the physical beginning of tape 121 and a locale, known as the load point 122, at which point the density identification segment 104 of magnetic tape 100 begins. The density identification segment 104 typically consists of 209 scan groups 700 (FIG. 7) written on magnetic tape 100. The density identification segment 104 represents data, for tape drive control unit 350 to access, indicative of the physical characteristics of magnetic tape 100. Internal leader header segment 105 is located at the end of density identification segment 104 of magnetic tape 100. The internal leader header 105 consists of three scan groups 700, the third of which is an ECC scan group to error check the two preceding internal leader header scan groups. The internal leader header 105 is followed by separator segment 106 of magnetic tape 100, which typically consists of 300 scan groups 700. The separator segment 106 isolates the logical beginning of tape (BOT) 123, which is the start of the data area 107 of magnetic tape 100, from the prepended header information described above. The data area 107 of magnetic tape 100 constitutes the majority of magnetic tape 100 and ends at the logical end of tape 124 which is a predetermined distance from tape to hub junction 126, wherein magnetic tape 100 is affixed to single reel 110 of magnetic tape cartridge 301. A length of trailer tape 109 may be interposed between the physical end (EOT) of tape 125 and tape to hub junction 126. This serves as a method of attaching magnetic tape 100 to reel 110 in order to provide a secure method of attachment thereto.

Internal Leader Header

The internal leader header 105 consists of administrative information such as:

Data Record Directory

Tape mark locations
Read Block ID locations
The record IDs at sub-sector boundaries

Administrative Information

Last scan group that was written (the end scan group)
Location of last Data Scan group written
Number of volume loads
Flag that third level ECC had to be invoked on read (marginal tape should be replaced)
Number of read/write errors for the last x mounts
Serial number of last y drives upon which this cartridge was mounted
Volume ID
Time and data stamp of mount
Tape type and length
Other pertinent information from Event Log and Buffered Log
Safe File information
Retry Status
ECC Scan Group Status
Manufacturer's ID and Production Batch Numbers The internal leader header segment 105 of magnetic tape 100 is read on every load of magnetic tape cartridge 301 into tape drive 300. The internal leader header segment 105 is updated by magnetic tape drive 300 prior to magnetic tape 100 being physically unloaded therefrom in order to update the administrative information contained therein. The internal leader header 105 illustrated in FIG. 5 includes two segments: media administrative information 501, and data record search directory 502. The data record search directory 502 includes a plurality of entries (502-1 to 502-n), one for each major delimiter (such as: read block ID, sector boundary and tape mark) written on to magnetic tape 100.

Data Record Directory

Each directory entry 502-* includes the information illustrated in FIG. 6 and is written by software elements located in tape drive control unit 350 used to create a scan group 700 for internal leader header 105. A logical block number 601 is a five byte long field that uniquely identifies every block written on to magnetic tape 100. This block number identifies each successive data record on magnetic tape 100 by a logical block number 601 which represents the logical block number of the previously written data record incremented by one. The second element in each entry 502-* is the physical sector field 602 of one byte length, which is the concatenation of the direction bit and segment number used in the LOCATE BLOCK command in 3490E-type tape drives. The third element in the entry 502-* is the sub-sector number 603 which is a one byte field that divides each physical sector into three smaller increments, thereby allowing a high speed portion of a search to position the tape closer to the requested logical block. The fourth element in the entry 502-* is a scan group count 604 of four bytes length which represents a unique physical location on magnetic tape 100. Every scan group 700 written on to magnetic tape 100 has a unique scan group number assigned to it in order to identify scan group 700 and differentiate it from all other scan groups 700 written on magnetic tape 100. The fifth element contained in the entry 502-* is a file identification number 605 of three bytes which identifies a numerical file in which scan group 700 is contained. The file identification 605 is used internally in tape drive 300 and is transparent to host computer 1. This file ID number 605 provides a scan group to file correspondence in order to simplify the administering of the data on magnetic tape 100. The sixth element in the entry 502-* is a logical scan group count 606 of four bytes that provides an identification of the logical scan group in which this data record is written. The seventh element in the entry 502-* is an identification 607 of the type of data written on magnetic tape 100. The final element in the entry 502-* is a reserved field 608 of four bytes for future use.

Administrative Information

FIG. 10 illustrates the information typically contained in the administration information section 501 of internal leader header 105. A first segment of administrative information 501 is the volume identification 1001 which consists of seven bytes that represent the volume identification number assigned to magnetic tape cartridge 301. A second section of administrative information 501 is the tape type, which is a two byte long field to indicate whether this is a file safe (write protected) tape, a tape with no third level ECC, a tape without error retry, etc. The third segment 1003 of administrative information 501 consists of a one byte indicator of tape length. A fourth segment 1004 of administrative information 501 is the tape manufacturer's identification and production batch number, which consists of 128 bytes of information, to provide the user with information concerning the date of manufacture of this media as well as the identification of the manufacturer and their particular production batch number. This information assists the user in identifying media that has been recalled by the manufacturer or media of a certain class that is more prone to errors than other similar types of media.

Further entries that can be included in administration information 501 are tape drive data 1005 indicative of the number of times that magnetic tape cartridge 301 has been loaded on tape drive 300 and the number of read and write cycles magnetic tape 100 has been subject to. This tape drive data can include the serial number of tape drive 300, as well as date and time stamps to record load activity. Another entry 1006 is a file safe flag byte to indicate write protect status of magnetic tape 100. Further information includes error data 1008, including a flag that indicates that the third level ECC had to be invoked on a read operation thereby indicating that this tape can be marginal and should be replaced by the user. This error data includes a record of the number of read/write errors detected and corrected in the last n times the magnetic tape 100 is mounted on a tape drive as well as the identification of the tape drives upon which this magnetic tape 100 was mounted. The error data 1008 includes a collection of all the error statistics that are produced during the last n mounts in order to enable host computer 1 to access this information in order to determine whether magnetic tape 100 is flawed or whether the associated tape drive 300 on which is was mounted is experiencing regular failures. Finally, additional memory is provided for future use to enable magnetic tape 100 to store predefined information, either selected by the user or defined by the tape drive manufacturer.

Data Format of the Helical Scan Magnetic Tape

Figure 2:
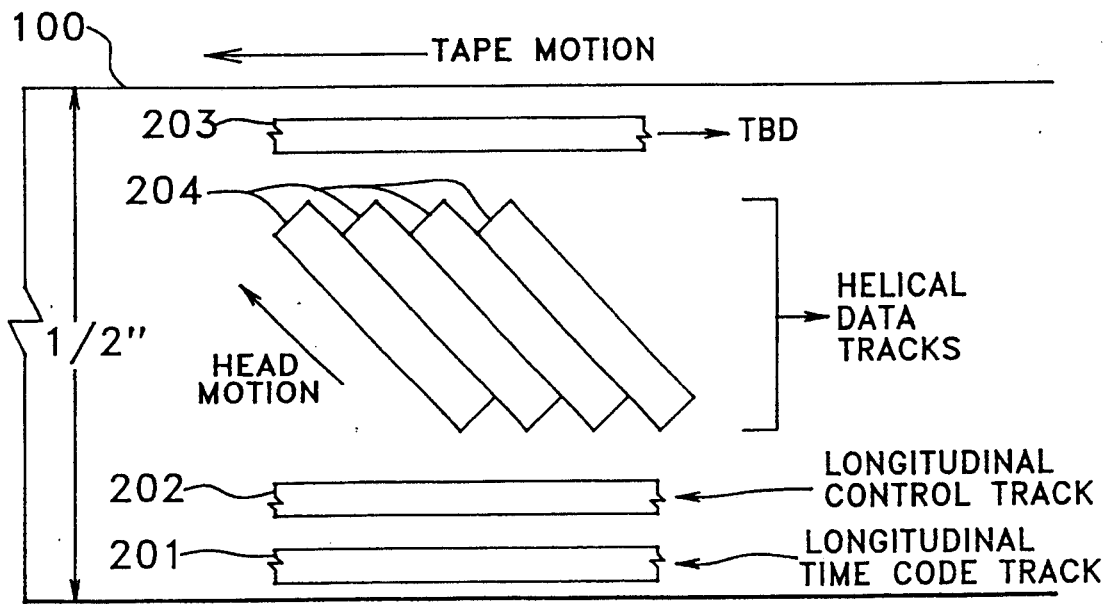
FIG. 2 illustrates the data recording format of helical scan magnetic tape.
Figure 7:
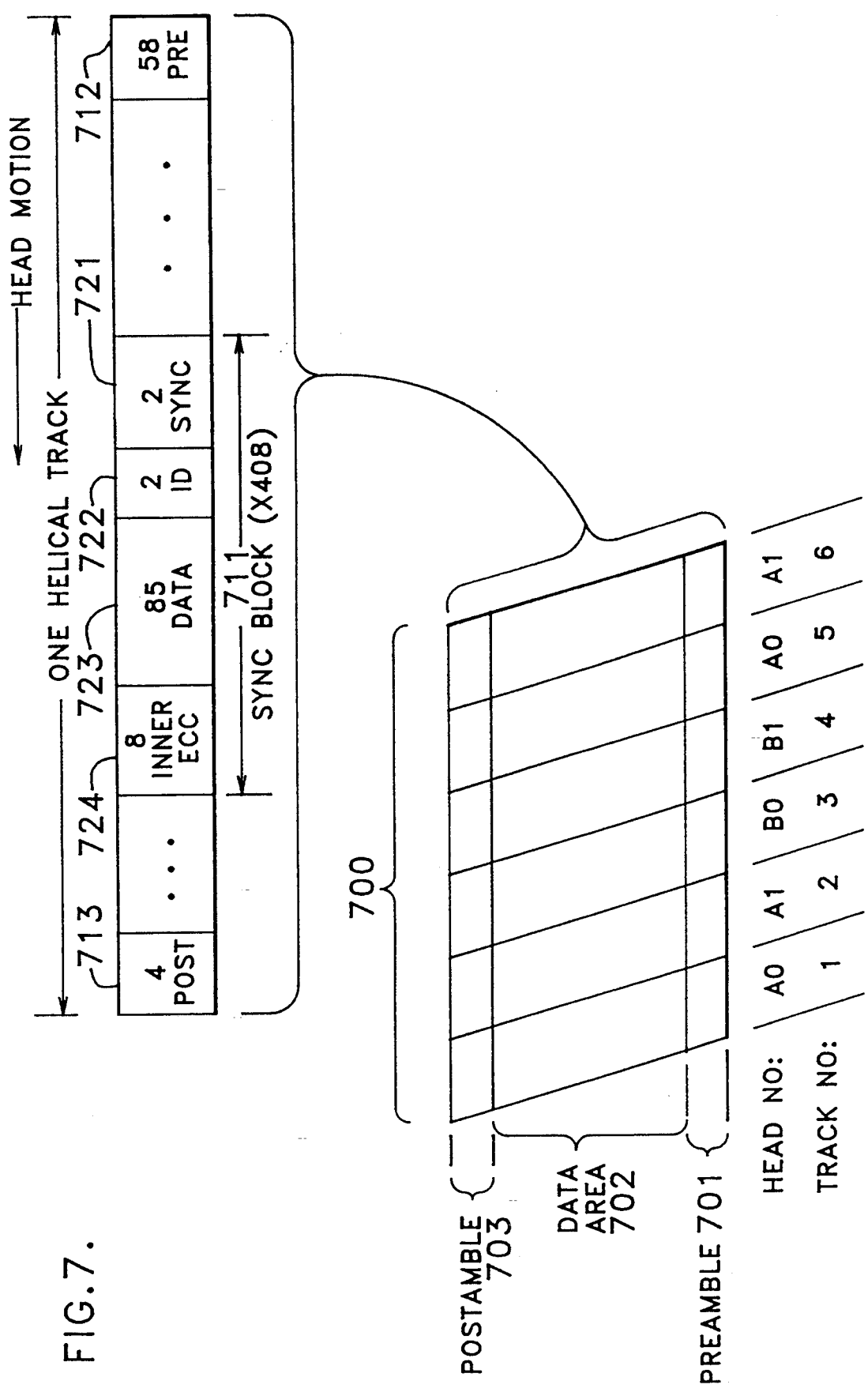
FIG. 7 illustrates the data recording format of the helical scan magnetic tape.

FIGS. 2 and 7 illustrate the data recording format of helical scan magnetic tape 100 used herein. Magnetic tape 100 is divided into 182 sectors, each of which is subdivided into a plurality of scan groups 700. The scan group 700 is the basic unit for formatting data on magnetic tape 100. As two adjacent write heads 321 of scanner 320 move across magnetic tape 100, two helical tracks 204 of data are simultaneously written on to magnetic tape 100. Once scanner 320 has completed one half of a revolution, the other pair of write heads 321 begins to write the next two adjacent tracks 204 on to magnetic tape 100. One and a half revolutions of scanner 320 produce the six tracks (1-6) illustrated in FIG. 7 to complete a single scan group 700. As can be seen from FIG. 7, a postamble 703 and preamble 701 are written on either end of the data area 702 of each track 204 written on to magnetic tape 100 in order to enable read heads 322 to accurately read the data contained therein.

In addition, the data format of a single helical track is illustrated in FIG. 7 to note that preamble 712 consists typically of fifty-eight bytes of data and postamble 713 includes four bytes of data. Interposed between preamble 712 and postamble 713 are 408 sync blocks 711, each of which contain eighty-five bytes of user data 723. In addition, two synchronization bytes 721 are prepended to data 723 along with two identification bytes 722. Eight bytes of inner error correcting code 724 are appended to the end of data 723 in order to complete the format of sync block 711. The inner ECC code 724 illustrated in FIG. 7 covers both data 723 and identification 722 but not synchronization bytes 721 contained in sync block 711. Therefore, a 93, 85 Reed Solomon code is formed to detect errors contained in data 723 and identification 722 fields of sync block 711. The sync pattern 721 portion of sync block 711 is a fixed pattern of data bits used to resynchronize the read clock and logic after dropouts. Of the 408 sync blocks 711 in a single track 204, twenty-four are used at the start of track 204 for outer ECC check bytes (described below). Therefore, there are $(408-24) \times 85 = 32,640$ bytes per track 24 of user data 723. With six tracks 204 per scan group 700, a scan group 700 therefore contains 195,840 bytes of user data 723.

Figure 9:
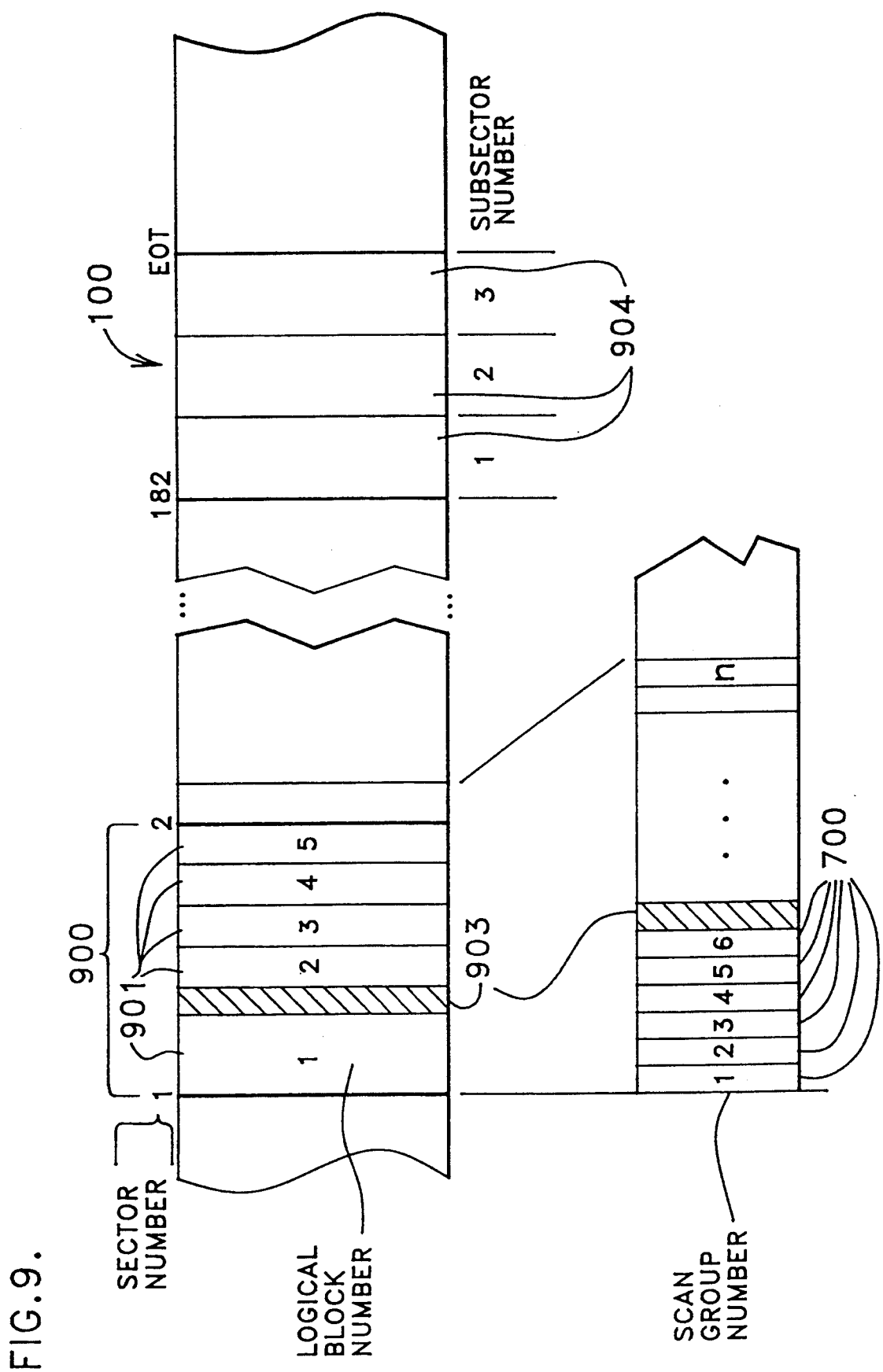
FIG. 9 illustrates the positioning information recorded on the magnetic tape.

FIG. 9 illustrates the positioning information recorded on the magnetic tape 100. The basic unit used to transfer data from the host computer 1 to magnetic tape 100 is the data block 901, which is analogous to a conventional data record. Each data block 901 sent by the host computer 1 to be written to magnetic tape 100 is sequentially assigned a unique block number by the tape drive control unit 350. Data blocks 901 are logical entities which may have different lengths, unlike fixed length blocks which are required by some prior art magnetic recording systems. A data block 901 may be larger than a physical scan group 700, and may also span two adjacent scan groups 700. Since each physical scan group 700 is the same size, the variable size of the data blocks 901 is transparent to the tape drive control unit 350 when a high speed data block search is conducted using the longitudinal track servo information in conjunction with the scan group location in the internal leader header 105.

Data block IDs are placed at all sector/subsector 900/904 boundaries in order to provide a mechanism for increasing the speed of a search, and for verifying the location of the contiguously stored data block 901. These data block IDs are referred to as "host block IDs" since the data block 901 is the basic unit used by the host computer 1 to write data to magnetic tape 100. Subsector 904 boundaries are locatable via the servo control track 202 at a 100× search speed. The fact that block IDs are placed at all subsector 904 boundaries allows a search for a specified block to be made which is three times closer in proximity to the specified data block 901 than a search using only whole sector 900 boundaries. Furthermore, the placement of block IDs at subsector 904 boundaries provides a verification of the correctness of a search to a particular subsector 904 wherein a block having a predetermined (expected) ID is expected to be found.

The scan group header included in the scan group 700 can include the following information:

| | | |
|---|---|---|
| 1. Type of scan group | | 1 byte |
| 2. Logical scan group number | | 4 bytes |
| 3. Beginning host block ID (Block ID of byte 0) | | 5 bytes |
| 4. Ending host block ID (Block ID of last byte) | | 5 bytes |

-continued

| | | |
|---|---|---|
| 5. File ID number | | 3 bytes |
| 6. Number of pad bytes in logical scan group | | 3 bytes |
| 7. Information data byte: File safe bit ECC Scan Group bit Write-without-retry bit | >-> | 2 bytes |
| 8. Continuation Information: First host block continued from previous scan group bit Ending host block continues into next scan group bit | >-> | 1 byte |
| 9. Scan group CRC | | 2 bytes |
| 10. Scan group header CRC (fixed) | | 2 bytes |
| 11. Pointer to first packet that begins in this scan group | | 3 bytes |
| 12. Variable Information: Physical Scan Group Count | | 4 bytes |
| Copy Count | | 1 byte |
| Variable CRC | | 2 bytes |
| 13. If an ECC group, the number of data groups covered by this ECC. If a data group, the sequence number within this ECC super-group. | | 1 byte |
| SUB TOTAL | | 39 |
| RESERVED | | 25 |
| TOTAL | | 64 |

Longitudial Tracks

The tape format for helical scan recorded magnetic tape 100 includes three longitudinal tracks 201–203 written on magnetic tape 100: servo control track 202, time code track 201 and one track 203, the use of which is to be determined. The servo control 202 and time code 201 tracks are located at the bottom of magnetic tape 100 while the unused track 203 is located at the top of magnetic tape 100. The servo control track 202 is recorded as helical tracks 204 are written onto magnetic tape 100 and contains pulse doublets that mark the location of each helical track preamble written on to magnetic tape 100. One use of servo control track 202 is to synchronize, during playback, the rotation of scanner 320 with the position of helical tracks 204 on magnetic tape 100. Another use of servo control track 202 is to position magnetic tape 100, while being transported at a 100× normal recording speed, to a specified scan group 700, based on scan group location information contained in the data record directory section 502 of internal leader header 105.

The time code track 201 is recorded as new helical tracks 204 are written on to magnetic tape 100. The time code track 201 contains location information that uniquely identifies each scan group 700 on magnetic tape 100. Similar location information is contained in the helical tracks 204 themselves, but the longitudinal time code track 201 can be read at a higher tape speed, i.e., at 60× normal recording speed. The longitudinal time code track 201 can be used to locate file marks (tape marks) on magnetic tape 100 during the high speed search activity. The various high speed search operations are used to position a particular physical location on magnetic tape 100 under the read/write heads 321, 322 of scanner 320 in a significantly faster time than prior art methods. These methods include positioning the tape to an approximate location of a desired data block, or, less efficiently, searching for the desired data block by performing a continuous read operation until the data block is located.

The servo system in a typical tape drive is capable of performing a high speed search to a scan group 700 which can be located via longitudinal track 202 on magnetic tape 100. The servo system can locate a particular video frame consisting of a group of twelve helical tracks 204 or two scan groups 700. By using servo control track 202, tape transport 300 can perform a high speed search at 100× normal recording speed to within one scan group containing the data record that is requested. This is a much finer resolution than can be obtained by using a simple but less accurate distance measurement employed by prior art tape drives.

Data Record Write to Magnetic Tape

Figure 8A:
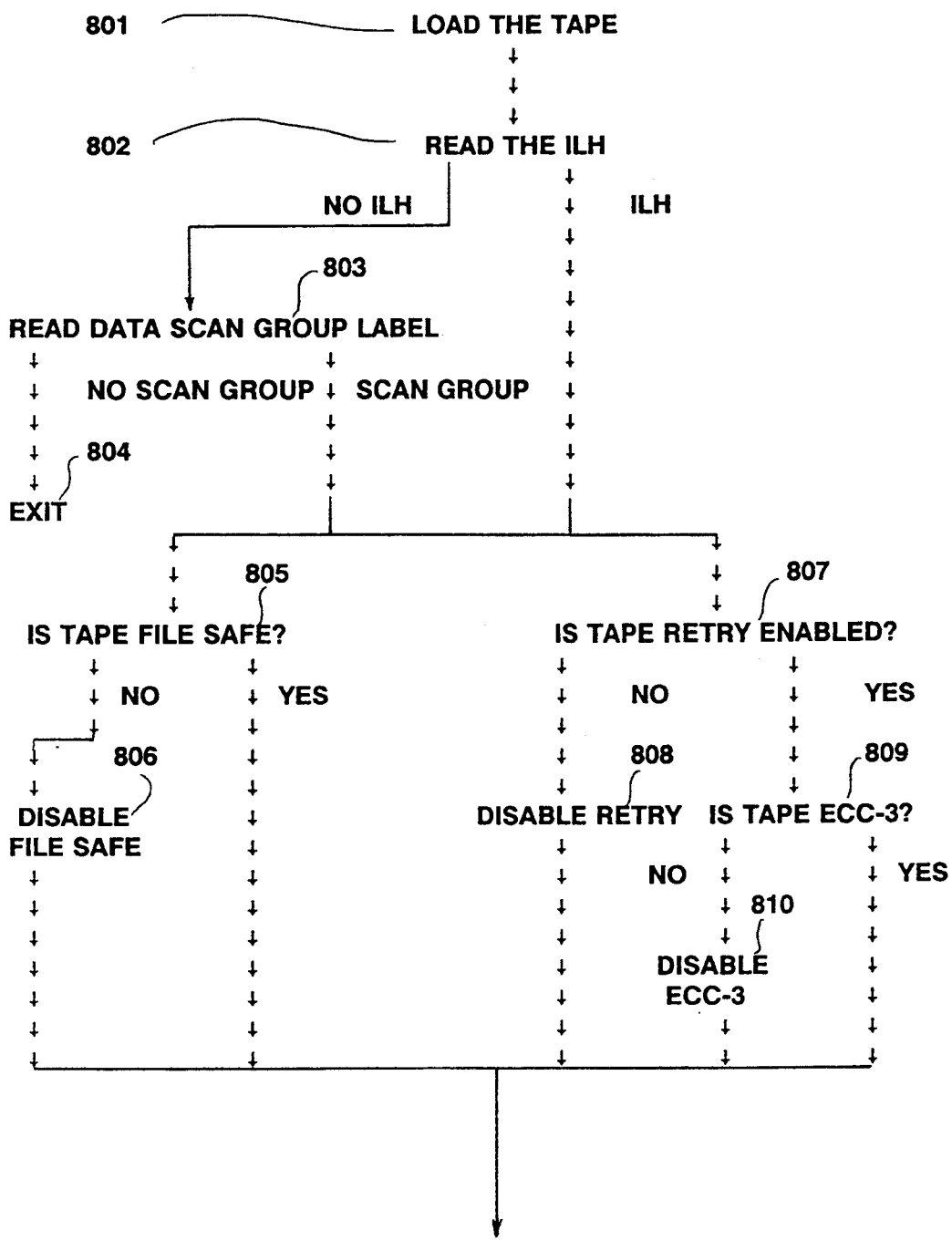
FIGS. 8(a) and 8(b) illustrates in flow diagram form the steps taken to write a file safe magnetic tape.
Figure 8B:
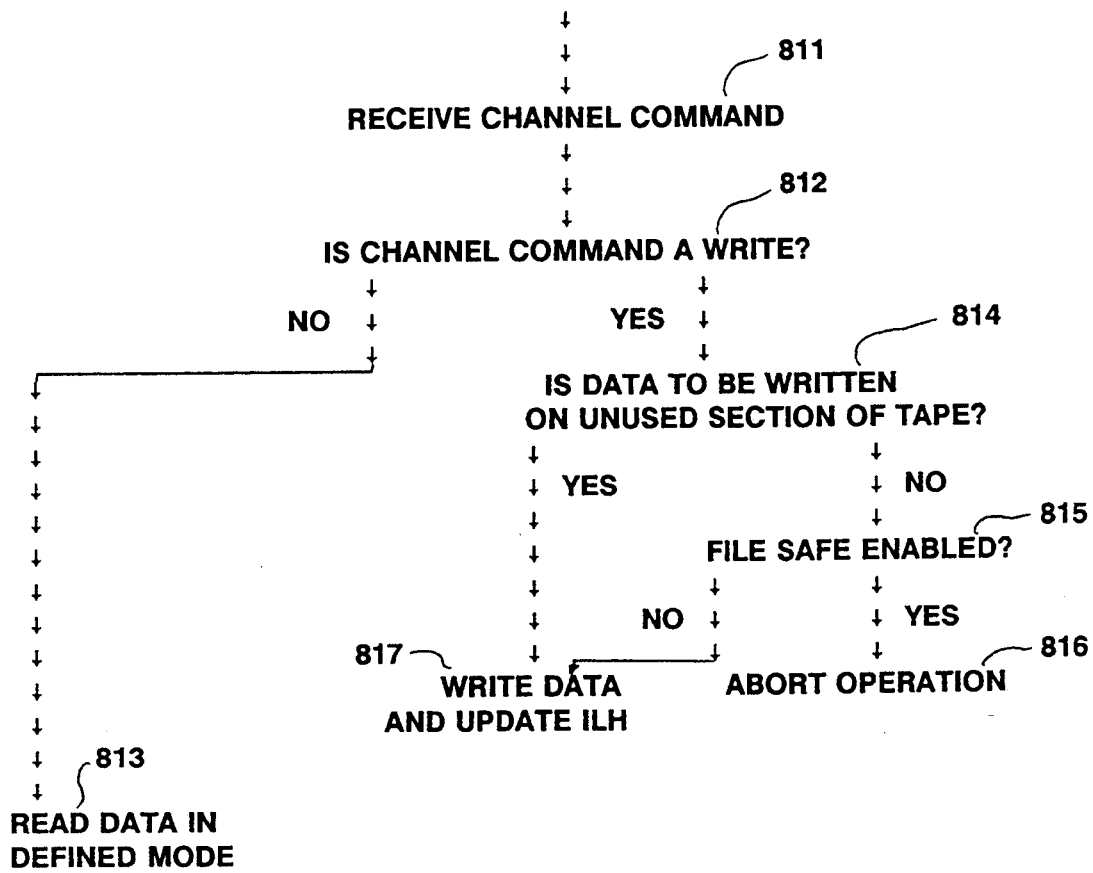

FIG. 8 illustrates in flow diagram form the operational steps taken by tape drive 300 to write data in helical scan form on magnetic tape 100. At step 801, a magnetic tape cartridge 301 is inserted into tape drive 300 and the tape drive mechanism illustrated in FIG. 3 loads the magnetic tape 100 by threading the leader block 101 and magnetic tape 100 through the tape threading path to the takeup reel 360 which rotates around spindle 361. At step 802, magnetic tape 100 is advanced forward in order to enable the tape drive control unit 350 to read the internal leader header 105 written on magnetic tape 100 via read heads 322 of scanner 320. The internal leader header 105 contains the information described above and enables tape drive control unit 350 to identify the required operational read/write mode as well as the physical location on magnetic tape 100 where the last data record was written.

Read/Write Mode Determination

The internal leader header 105 includes data in the administrative data section 502 that defines the read/write operational state of the associated tape drive 300. In particular, there are a plurality of read/write modes that a tape drive 300 can assume to read and write the data on magnetic tape 100. At step 807, the tape drive control unit 350 reviews the administrative data 502 read from the internal leader header 105 to determine whether the retry enable bit is set which defines one of the modes of writing data on magnetic tape 100. In particular, write without retry is a capability that is enabled in response to the host computer 1 transmitting a write without retry command to the tape drive 300 when magnetic tape cartridge 301 is mounted in the tape drive 300 and prior to the data being written thereon. The write without retry function disables a portion of the tape drive control unit error correction capability. In particular, when the tape drive control unit 350 receives data from the host computer 1, it corrects data errors contained therein. In addition, when the data is to be written from the buffer contained within the tape drive control unit 350 to the magnetic tape 100, the tape drive control unit 350 performs a number of error detection and correction operations to ensure that the data written from the buffer onto magnetic tape 100 contains no errors therein. If an error is detected during this write process, tape drive control unit 350 rewrites the data in a new scan group further down the magnetic tape 100 from the presently writing scan group. This retry capability thereby enables the tape drive control unit 350 to write scan groups containing error free data. The previously written scan group containing erroneous data is simply flagged as being invalid and is ignored during a read operation. This write with retry feature allows tape drive 300 to continue writing in a forward motion without interrupting the motion of magnetic tape 100. The impact of the retry feature on performance is minimized due to the fact that there is no tape repositioning, however the overall throughput of the system is somewhat decreased because the scan groups have to be rewritten if they contain errors. If the retry flag in the administrative data 502 is set to disable the retry capability, the tape drive control unit 350 simply writes the stream of data onto the magnetic tape 100 without any error correction taking place. The tape drive control unit 350 can log data errors that are detected in the administrative portion 502 of the internal leader header 105 but these errors are not corrected by rewriting scan groups. In order to denote the retry status of the magnetic tape 100, a write without retry mode bit is provided in the administrative data portion 502 of the internal leader header 105 and, an additional write without retry status bit is written in the header portion of each scan group written onto magnetic tape 100. This provides a redundancy capability such that if the internal leader header 105 is unreadable or absent from magnetic 100 tape for some reason then each scan group is protected by the replication of the identical administrative data concerning the read/write mode status of magnetic tape 100.

During the read process, tape drive 300 retrieves the retry status data from the internal leader header 105 to determine what operational mode tape drive 300 must assume to properly read the data contained on magnetic tape 100. The retry status is significant in that there are four levels of error recovery in the tape drive 300. When a scan group can not be read, the first level of error recovery involves reading further down the magnetic tape 100, searching for another copy of the unreadable scan group. If the tape drive 300 is processing in a read without retry mode, this first level of error recovery is eliminated since it is guaranteed that there is not another copy of this scan group further down magnetic tape 100 and reliance must be had on the other error detection and correction capabilities of the tape drive 300 to recover this data. The second level of error recovery makes use error correcting code (ECC) scan groups that are periodically written on the magnetic tape 100 in series with the data records that are written on the magnetic tape 100 to store the results of an error correction calculation across the data records that are written in a predetermined number of scan groups. This ECC scan group is used to regenerate the missing scan group as the first level of error recovery if the retry feature is disable on this magnetic tape 100. If this error recovery procedure is effective to recover the missing scan group, then the recovered data is available to the host computer 1 and is marked as good data. If the ECC scan group capability is unsuccessful in its attempt to reconstruct the missing scan group, no further error correction activity is implemented and the copy of the scan group stored in the buffer is marked as valid but bad data.

ECC Scan Groups

Another read/write operational mode that must be defined for tape drive 300 is the use of ECC scan groups on the magnetic tape 100 as an additional level of error detection and correction capability on the magnetic tape 100. The host computer 1 upon initial load of the magnetic tape cartridge in the drive element defines whether this magnetic tape 100 contains ECC scan groups as an error detection and correction capability. The host computer 1 accomplishes this by transmitting data to the tape drive 300 to define the ECC scan group mode prior to any data records being written on to this magnetic tape 100. This mode is applicable to the entirety of the magnetic tape 100 and once set can not be reset. When the tape drive 300 receives this command, it disables the error correction code scan group generation software in the tape drive control unit 350 and simply writes the data records in scan groups on to the magnetic tape 100 with the error correction codes embedded in the header portion of each scan group. The use of the ECC scan groups improves the error detection and correction performance of the magnetic tape 100 but makes use of approximately four percent of the magnetic tape 100 for this purpose. Therefore, disabling the use of ECC scan groups somewhat improves the throughput of the tape drive 300 and provides more data storage capability on the magnetic tape 100. The ECC scan group mode bit is also set in the header of each scan group that is written on to the magnetic tape 100 so that if the internal leader header 105 is unreadable, each scan group is protected by defining the read/write mode in the header of each scan group.

During a read operation, the tape drive 300 retrieves the administrative information from the internal leader header 105 and reads the ECC scan group bit contained therein in order to determine whether this magnetic tape 100 contains ECC scan groups interposed with the data scan groups. The default mode is to have the ECC scan groups on the magnetic tape 100, and therefore, if the ECC scan group flag is set to indicate that this capability is disabled then the tape drive 300 simply reads all the scan groups as a string of data records with no interposed error correction code information provided. This is accomplished by disabling the error correction code scan group decoding software contained within the tape drive control unit 350. If the internal leader header 105 is unreadable, then during the read process, the tape drive 300 determines the ECC scan group mode of this magnetic tape 100 by retrieving the corresponding mode defining information from the header contained in each scan group. Once the tape drive 300 detects the presence of an ECC scan group bit, even though the internal leader header 105 is absent from magnetic tape 100, this bit defines the operational mode of the tape drive 300 for the entirety of this magnetic tape 100.

The magnetic tape 100 is therefore self defining in that the data contained in the administrative portion 502 of the internal leader header 105 as well as in the header of each scan group define the read/write operational state required of the tape drive 300 to properly read the data contained on this magnetic tape 100. The use of the two levels of read/write mode defining information provide a level of security to ensure that the magnetic tape 100 is properly processed by setting the tape drive 300 read/write mode in the proper mode of operation.

At step 805, control unit 350 determines from the administrative data written in internal leader header 105 whether this magnetic tape 100 is a "file safe" tape. If the file safe flag is not set in administrative section 501, control unit 350 disables the file safe feature and reads/writes the data records on magnetic tape 100 without restriction as described below. If control unit 350 determines at step 805 that magnetic tape 100 is a file safe tape, at step 811 tape drive control unit 350 presents a ready signal to host computer 1 indicating that tape drive 300 is ready to receive data and commands from host computer 1 via data channel 2.

Host Computer Command

At step 805, host computer 1 transmits data over data channel 2 that interconnects it to tape drive 300 and the data is written into a buffer in tape drive control unit 350. As the data is written into the buffer, tape drive control unit 350 checks for errors to make sure there are no transmission errors in the data received from host computer 1. Since tape drive 300 can typically write data to magnetic tape 100 faster than host computer 1 can write the data into the control unit buffer, tape drive control unit 350 waits for host computer 1 to complete its data transmission and checks for errors.

Tape drive control unite 350 determines at step 812 whether the received channel command is a write operation. If not, the file safe status of magnetic tape 100 is not relevant to the requested operation. If the received channel command is a data record write operation, control unit 350 at step 814 determines whether the scan group is to be written on magnetic tape 100 past the end of the last data group written on magnetic tape 100. Control unit 350 makes this determination by reading the last scan group data 1007 from the administrative section 501 of internal leader header 105 and comparing this data with the scan group data received from host computer 1 in the channel command. If the received data record is to be written in the section of magnetic tape 100 containing previously written data, at step 816, control unit 350 transmits a "tape is file protected" command to host computer 1 to indicate that the received data record cannot be written on magnetic tape 100. If the received data record is to be written on the unused portion of magnetic tape 100, tape drive control unit 350 ensures that scanner 320, magnetic tape 100 and servos (not shown) are all synchronized. The control unit 350 positions magnetic tape 100 to the physical location on magnetic tape 100 that immediately follows the last written data record and retrieves the scan group 700 to be written. Control unit 350 activates the read/write mechanism to write the scan group to magnetic tape 100 and the read after write process reads scan groups 700 as they are written on to magnetic tape 100 in order to ensure their integrity. At this point, control unit 350 writes a plurality (typically three) pad groups and an end group after the last written scan group in order to complete the writing of this stream of data records. Magnetic tape 100 is then rewound to its beginning and internal leader header 105 is rewritten with updated information concerning the physical location and identity of the data records that have just been written on magnetic tape 100. Control unit 350 also writes updated information into the administrative information section 501 of internal leader header 105 and presents a ready status to host computer 1.

Creating a File Safe Magnetic Tape

Figure 4:
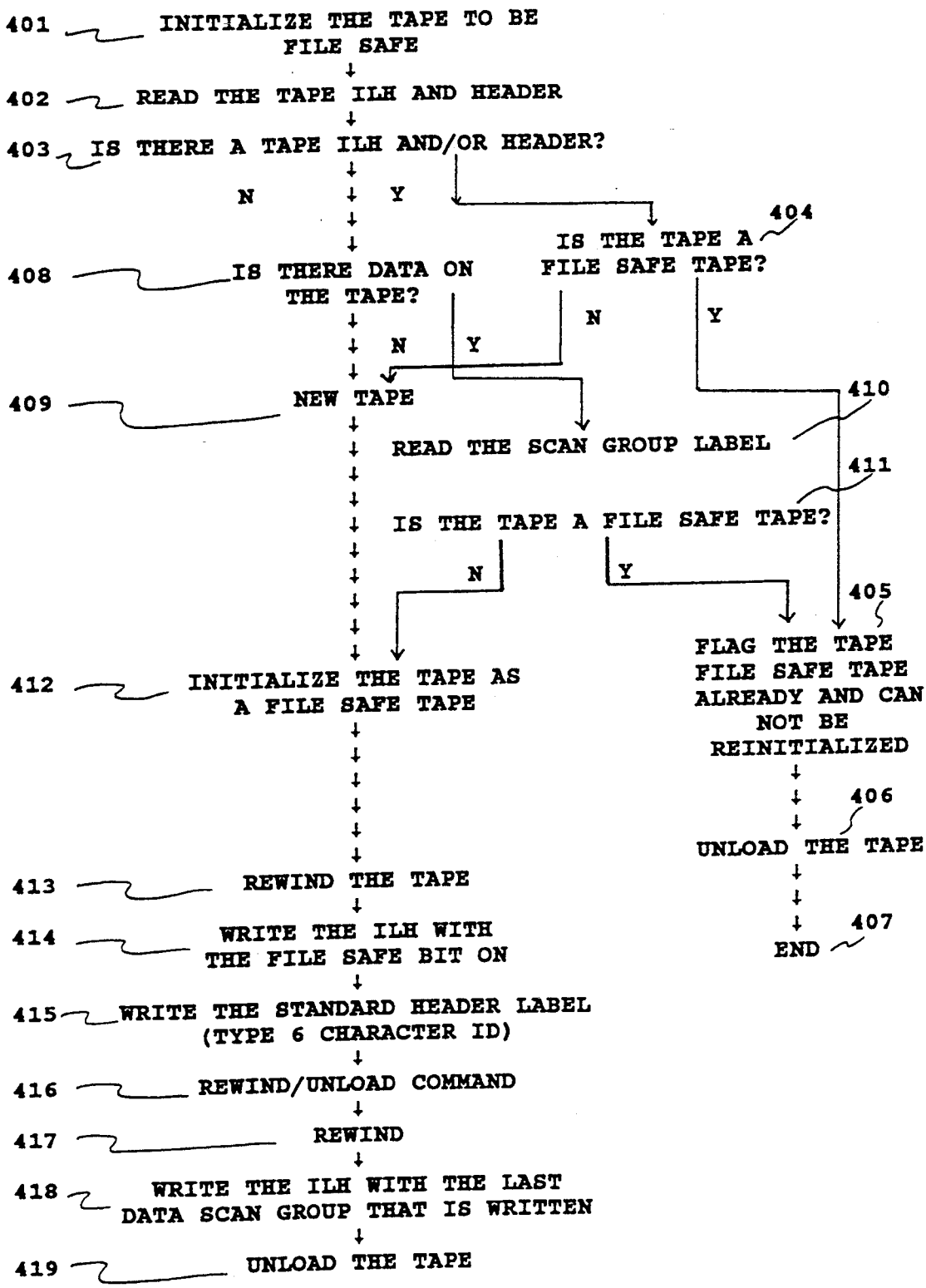
FIG. 4 illustrates in flow diagram form the steps taken to create a file safe magnetic tape.

FIG. 4 illustrates in flow diagram form the operational steps taken by tape drive 300 to create a file safe tape using a previously recorded tape or a blank tape. At step 401, tape drive control unit 350 receives a channel command from the host computer 1 to initialize the magnetic tape 301 that has been mounted in tape drive 300 to be a file safe tape. At step 402, tape drive control unit 350 reads the beginning of magnetic tape 100 to determine whether there is an internal leader header 105 located thereon. At step 403, tape drive control unit 350 makes a determination of whether magnetic tape 100 has an internal leader header 105 or is a scratch tape. If there is an internal leader header 105, at step 404 tape drive control unit 350 determines from the administrative data contained within the internal leader header 105 whether magnetic tape 100 is a file safe tape. If it is, at step 405 control unit 350 flags magnetic tape 100 as a file safe tape that can not be rewritten and transmits a message to host computer 1 to indicate that this tape is file protected and cannot be overwritten because it already is a file safe tape. At step 406 tape drive 300 dismounts magnetic tape 100 and unloads the cartridge 301 for retrieval by the operator. At step 407, tape drive 300 terminates its operation and awaits another magnetic tape cartridge 301 to be loaded therein and receipt of further commands from host computer 1.

Missing Internal Leader Header

If, at step 403 control unit 350 determines that there is no internal leader header 105 on this magnetic tape 100, then control unit 350 determines at step 408 whether data is written on magnetic tape 100. If data is written on magnetic tape 100, tape drive 300 reads the label or header on a scan group of data to determine the operational mode required to read magnetic tape 100. If the tape is labeled as file safe in the scan group, processing advances to step 405 as described above. If not, processing advances to step 412 where processing proceeds if at step 409 it was determined that magnetic tape 100 is a new tape or scratch tape. Processing also advances to step 412 wherein control unit 350 begins the file safe tape initialization process.

File safe initialization is accomplished by tape drive 300 at step 413 rewinding magnetic tape 100 in its entirety into magnetic tape cartridge 301 since a part of magnetic tape 100 was spooled onto the takeup reel 360 as control unit 350 looked for the internal leader header 105 on this magnetic tape 100. The magnetic tape 100 is now completely rewound on magnetic tape cartridge 301 and ready at step 414 for the tape drive 300 to write the internal leader header 105 thereon with the file safe bit 1006 in the on position in the administrative data 501 contained in the internal leader header 105. At step 415, the standard header label consisting of a six character cartridge identification is also written onto magnetic tape 100 in order to uniquely identify it. Once this has been accomplished, tape drive 300 stops the motion of magnetic tape 100 and awaits further commands from the host computer 1. If host computer 1 instructs tape drive 300 to write data records onto this magnetic tape 100, control unit 350 creates the scan groups 700, each of which contains a file safe bit in its header, and writes these scan groups 700 onto the magnetic tape 100 immediately following the internal leader header 105 that was Just placed thereon. Absent the host computer writing new data records onto this magnetic tape 100, the host computer 1 transmits at step 416 a rewind/unload channel command to tape drive 300. At step 417, tape drive 300 rewinds the magnetic tape 100 in its entirety into the magnetic tape cartridge 301 and at step 418 rewrites the internal leader header 105 with last scan group data 1007 indicative of the physical position of the last data scan group on the magnetic tape 100. If this is a magnetic tape 100 with no data records, the end of internal leader header 105 is identified as the last scan group written on magnetic tape 100. The magnetic tape 100 is then re-rewound and at step 419 the magnetic tape cartridge 301 is unloaded from tape drive 300 for retrieval by the operator. Therefore, the magnetic tape 100 itself contains the definition of the file safe status of the magnetic tape 100 and each data record contained thereon. The tape drive 300 can manage this file safe status of the magnetic tape independent of the host computer 1 and therefore the protection of the data records on the magnetic tape 100 is not dependent on the host computer 1 since the file safe information is physically co-located with the data records to be protected.

While a specific embodiment of this invention has been disclosed, it is expected that those skilled in the art can and will design alternate embodiments of this invention that fall within the scope of the appended claims.

We claim:

1. In a drive element that reads and writes data records received from a host computer on rewritable serial media, apparatus operationally independent of said host computer for maintaining administrative data on said rewritable serial media, comprising:
   means for writing raid administrative data in a predefined segment of said rewritable serial media, independent of said host computer including data indicative of a rewritable serial media read/write status;
   means for writing media read/write mode defining data into said administrative data to indicate an operational mode required of said drive element to read/write data on said rewritable serial media; and
   means for inserting media file safe status data into a header of each said data record written on to said rewritable serial media to indicate whether said rewritable serial media is write protected.

2. The apparatus of claim 1 wherein said administrative data writing means includes:
   means for segmenting said rewritable serial media into a first segment for storing said administrative data and a second segment for storing said data records.

3. The apparatus of claim 1 further comprising:
   means for inserting data record location information for a selected data record into said administrative data and writing said administrative data corresponding to said selected data record substantially concurrently with said selected data record on to said rewritable serial media, to identify a physical location of said selected data record on said rewritable serial media.

4. The apparatus of claim 3 wherein said data record location inserting means includes:
   means for inserting a data record sequence number indicative of the relative position of a selected data record in said stream of data records into said administrative data, and writing said administrative data corresponding to said selected data record substantially concurrently with said selected data record on to said rewritable serial media.

5. The apparatus of claim 4 wherein said data record location inserting means includes:
   producing a set of administrative data for each data record successively written on to said rewritable serial media where each successively written set of administrative data contains a data record sequence number greater than said data record sequence number in a previously written set of administrative data.

6. The apparatus of claim 3 further comprising:
   means, responsive to the presence of said media file safe status data on said rewritable serial media indicative of a media write protect status, for disabling said drive element from writing data records on to said rewritable serial media except past a last previously written data record as defined by said data record location information.

7. The apparatus of claim 1 further comprising:
   means for inserting into a header, prepended to each of said data records substantially concurrently with writing each of said data records on to said rewritable serial media, data record read/write mode defining information to indicate an operational mode required of said drive element to read/write said data records.

8. The apparatus of claim 7 further comprising:
   means for inserting data record file safe data into said data record read/write mode defining information to indicate whether said data record is write protected.

9. The apparatus of claim 8 further comprising:
   means, responsive to the absence of said media read/write mode defining data and the presence of data record file safe data indicative of a data record write protect status, for disabling said drive element from writing data records on to said rewritable serial media except past a last previously written data record as defined by said data record location information.

10. The apparatus of claim 1 further comprising:
    means for inserting media retry status data into said media read/write mode defining data to indicate whether said drive element must read/write said data records on said rewritable serial media without rewriting data records found to contain errors.

11. The apparatus of claim 10 further comprising:
    means, responsive to the presence of said media retry status data on said rewritable serial media indicative of a media no-retry status, for writing data records on said rewritable serial media without rewriting data records found to contain errors.

12. The apparatus of claim 7 further comprising:
    means for inserting data record retry status data into said data record read/write mode defining information to indicate whether said drive element must read/write said data record on said rewritable serial media without rewriting data records found to contain errors.

13. The apparatus of claim 12 further comprising:
    means, responsive to the absence of said media read/write mode defining data and the presence of said data record retry status data, for writing data records on said rewritable serial media without rewriting data records found to contain errors.

14. The apparatus of claim 1 further comprising:
    means for inserting media ECC scan group data into said media read/write mode defining data to indicate whether said drive element must write ECC scan groups on said rewritable serial media.

15. The apparatus of claim 14 further comprising:
    means, responsive to the presence of said media scan group data on said rewritable serial media indicative of an ECC enabled state, for writing ECC data on said rewritable serial media following a predetermined number of data records written on said rewritable serial media and calculated over said predetermined number of data records.

16. The apparatus of claim 7 further comprising:
means for inserting data record ECC scan group data into said data record read/write mode defining information to indicate whether said drive element must write ECC scan groups on said rewritable serial media.

17. The apparatus of claim 16 further comprising:
means, responsive to the absence of said media read/write mode defining data and the presence of said data record ECC scan group data, for writing ECC data on said rewritable serial media following a predetermined number of data records written on said rewritable serial media and calculated over said predetermined number of data records.

18. In a drive element that reads and writes data records, received from a host computer on rewritable serial media, a method for providing, operationally independent of said host computer administrative data on said rewritable serial media, comprising the steps of:
writing said administrative data in a predefined segment of said rewritable serial media, independent of said host computer including data indicative of a rewritable serial media read/write status; and
writing media read/write mode defining data into said administrative data to indicate an operational mode required of said drive element to read/write data on said rewritable serial media; and
inserting media file safe status data into a header of each said data record written on to said rewriteable serial media to indicate whether said rewritable serial media is write protected.

19. The method of claim 18 wherein said step of writing said administrative data includes:
segmenting said rewritable serial media into a first segment for storing said administrative data and a second segment for storing said data records.

20. The method of claim 21 further comprising the step of:
inserting data record location information for a selected data record into said administrative data and writing said administrative data corresponding to said selected data record substantially concurrently with said selected data record on to said rewritable serial media, to identify a physical location of said selected data record on said rewritable serial media.

21. The method of claim 20 wherein said step of data record location inserting includes:
inserting a data record sequence number indicative of the relative position of a selected data record in said stream of data records into said administrative data, and writing said administrative data corresponding to said selected data record substantially concurrently with said selected data record on to said rewritable serial media.

22. The method of claim 21 wherein said step of data record location inserting includes:
producing a set of administrative data for each data record successively written on to said rewritable serial media where each successively written set of administrative data contains a data record sequence number greater than said data record sequence number in a previously written set of administrative data.

23. The method of claim 20 further comprising the step of:
disabling, in response to the presence of said media file safe status data on said rewritable serial media indicative of a media write protect status, said drive element from writing data records on to said rewritable serial media except past a last previously written data record as defined by said data record location information.

24. The method of claim 18 further comprising:
inserting into It header, prepended to each of said data records substantially concurrently with writing each of said data records on to said rewritable serial media, data record read/write mode defining information to indicate an operational mode required of said drive element to read/write said data records.

25. The method of claim 24 further comprising the step of:
inserting data record file safe data into said data record read/write mode defining information to indicate whether said data record is write protected.

26. The method of claim 25 further comprising the step of:
disabling, in response to the absence of said media read/write mode defining data and the presence of data record file safe data indicative of a data record write protect status, said drive element from writing data records on to said rewritable serial media except past a last previously written data record as defined by said data record location information.

27. The method of claim 18 further comprising the step of:
inserting media retry status data into said media read/write mode defining data to indicate whether said drive element must read/write said data records on said rewritable serial media without rewriting data records found to contain errors.

28. The method of claim 27 further comprising the step of:
writing, in response to the presence of said media retry status data on said rewritable serial media indicative of a media no-retry status, data records on said rewritable serial media without rewriting data records found to contain errors.

29. The method of claim 24 further comprising the step of:
inserting data record retry status data into said data record read/write mode defining information to indicate whether said drive element must read/write said data record on said rewritable serial media without rewriting data records found to contain errors.

30. The method of claim 29 further comprising the step of:
writing, in response to the absence of said media read/write mode defining data and the presence of said data record retry status data, data records on said rewritable serial media without rewriting data records found to contain errors.

31. The method of claim 18 further comprising the step of:
inserting media ECC scan group data into said media read/write mode defining data to indicate whether said drive element must write ECC scan groups on said rewritable serial media.

32. The method of claim 31 further comprising the step of:
writing, in response to the presence of said media scan group data on said rewritable serial media indicative of an ECC enable state, ECC data on said rewritable serial media following a predetermined number of data records written on rewritable serial media and calculated over said predetermined number of data records.

33. The method of claim 24 further comprising the step of:

inserting data record ECC scan group data into said data record read/write mode defining information to indicate whether said drive element must write ECC scan groups on said rewritable serial media.

34. The method of claim 33 further comprising the step of:

writing, in response to the absence of said media read/write mode defining data and the presence of said data record ECC scan group data, ECC data on said rewritable serial media following a predetermined number of data records written on said rewritable serial media and calculated over said predetermined number of data records.

* * * * *